United States Patent [19]
Gerritsma et al.

[11] 3,902,789
[45] Sept. 2, 1975

[54] DEVICE COMPRISING A LAYER OF LIQUID CRYSTAL

[75] Inventors: Cornelis Jan Gerritsma, Eindhoven; Willem Christiaan Kleijn, The Hague, both of Netherlands

[73] Assignee: U.S. Philips Corporation, New York, N.Y.

[22] Filed: June 21, 1974

[21] Appl. No.: 481,494

Related U.S. Application Data

[63] Continuation of Ser. No. 424,112, Dec. 12, 1973, abandoned, which is a continuation of Ser. No. 293,770, Oct. 2, 1972, abandoned.

[30] Foreign Application Priority Data
Oct. 2, 1971 Netherlands...................... 7113564

[52] U.S. Cl. .......................................... 350/160 LC
[51] Int. Cl.² ............................................ G02F 1/13
[58] Field of Search ............................. 350/160 LC

[56] References Cited
UNITED STATES PATENTS
3,656,834  4/1972  Haller et al. ........................ 350/150

Primary Examiner—Edward S. Bauer
Attorney, Agent, or Firm—Frank R. Trifari; Carl P. Steinhauser

[57] ABSTRACT

A device comprising a liquid crystal between two supporting plates. The plates are spaced apart by wire-shaped means.

1 Claim, 1 Drawing Figure

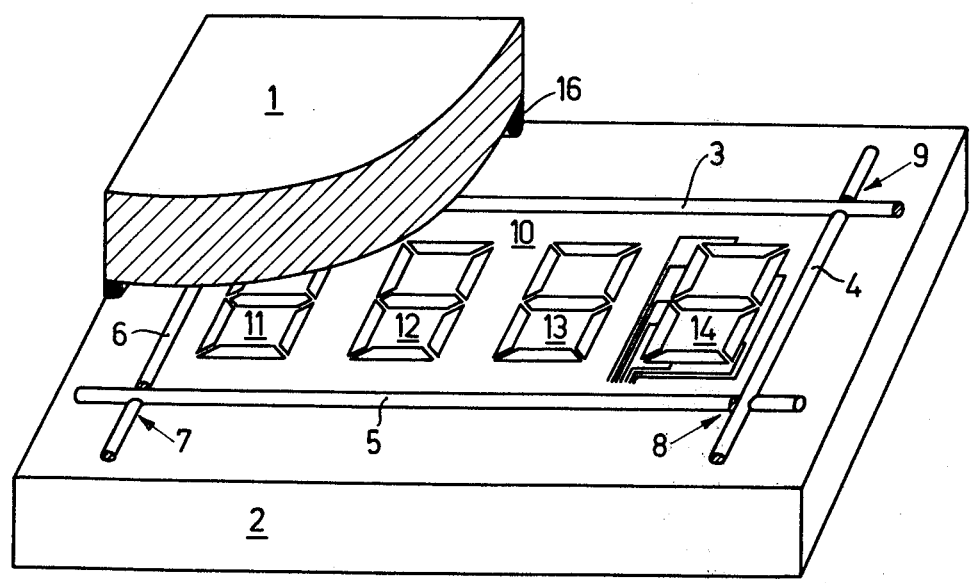

DEVICE COMPRISING A LAYER OF LIQUID CRYSTAL

This is a continuation of application Ser. No. 424,112, filed Dec. 12, 1973, and now abandoned, which in turn is a continuation of application Ser. No. 293,770, filed Oct. 2, 1972, now abandoned.

The invention relates to a device comprising two parallel supporting plates, a layer of liquid crystal between the supporting plates, and means for spacing the supporting plates.

Such a device is known from the article "Dynamic Scattering: A new electrooptic effect in certain classes of nematic liquid crystals" in Proceedings of the I.E.E.E., Volume 56, No 7, July, 1968. Liquid crystals are materials having the flow properties of liquids and a certain ordering of the molecules as in crystals. In accordance with the ordering of the molecules, three classes of liquid crystals are distinguished: smectic, nematic and cholesteric. A device of the type mentioned in the first paragraph comprises one of these types of liquid crystal and is generally used for displaying information, for example, in the form of characters. For this purpose, the arrangement of the molecules is locally disturbed, under the influence of, for example, an electric field, as a result of which the optical properties of the layer of liquid crystal vary. As a result of this, for example, the layer becomes locally cloudy. This change of the optical properties is used to display characters. Such a device is passive, which means that the device itself does not transmit light but modulates ambient light. The advantage of this is that only little energy need be supplied.

Devices of the type described comprise in general an extremely thin layer of liquid crystal in a thickness of the order of a few $\mu$m to a few tens of $\mu$m. It is of great importance that the distance between the supporting plates have exactly the correct value and be the same throughout the surface of the layer of liquid crystal. In known devices of the type described the supporting plates are generally spaced apart by strips of foil of an insulating material, for example mylar or teflon. The use of foil is found to experience great drawbacks. As a matter of fact, when the foil is cut, the cut edges appear to curl slightly and show burrs. Experiments have proved that when cut foil is used in a thickness of 12 $\mu$m the distance between the supporting plates may be between 20 and 24 $\mu$m. This uncertainty in the distance between the supporting plates is unacceptable. The strips of foil are therefore usually manufactured by means of a photo-etching method. It is obvious that this is a rather complicated manner to manufacture such strips. Moreover, etched strips also have the drawback of attracting particles of dust by electrostatic charge. Said particles of dust also cause an uncertainty in the distance between the supporting plates.

It is the object of the invention to provide a device of the type mentioned in the first paragraph having very simple means for spacing the supporting plates, which means nevertheless ensure an accurately determined distance. In a device according to the invention the means for spacing the supporting plates are wire-shaped and have a circular cross-section. Wire of metal or some type of plastic or another is simple to obtain in any desirable thickness, in which moreover the thickness is very constant. It has furthermore been found that if several pieces of wire are used, for example, four straight pieces parallel to the four edges of the device, these wires may cross each other. At the crossings such a large material stress is formed during assembling the device, in connection with the very small diameter of the wire, that one of the wires breaks at the area and the crossing does not become thicker than the diameter of the crossing wires. Substantially any type of material may be used for the wires, although it has been found that glass wires break too easily in connection with their low strength. Excellent results have been obtained with metal and plastic wires and in particular with nylon and tungsten wires.

The invention will be described in detail with reference to the accompanying drawing of a device having a layer of liquid crystal.

The device shown comprises a supporting plate 1 which is shown partly in cross-section in the FIGURE, and a supporting plate 2. The plates 1 and 2 which are manufactured from glass are spaced apart by four nylon wires 3, 4, 5 and 6 having a thickness of 10 $\mu$m and are cemented together along the edge 16. When the plates 1 and 2 were pressed on each other, said wires broke at the crossings 7, 8 and 9 and a fourth crossing which is not visible in the drawing. The space 10 bounded by the plates 1 and 2 and the wires 3, 4, 5 and 6 is filled with a nematic liquid crystal. Electrodes are provided on the facing sides of the plates 1 and 2. An electrode in the form of a thin layer of aluminum which is not visible in the drawing and which extends over the greater part of the space 10 is present on the plate 1. The plate 2 comprises a number of electrodes manufactured from a transparent layer of tin oxide, which electrodes are divided into four groups 11, 12, 13 and 14. Each of these groups comprises seven electrodes. The connections of the electrodes are partly shown near group 14. In order to avoid complexity of the drawing, said connections are omitted near 11, 12 and 13. By giving certain combinations of electrodes a certain potential relative to the electrode at the plate 1, certain digits are displayed which can be observed though the transparent plate 2. Said observability is obtained in that turbulences occur in the layer of liquid crystal at the area of voltage-conveying electrodes, which scatter the ambient light in a diffuse manner. The digits then become visible by their dull surface relative to the mirroring aluminum electrode on the plate 1. The device is filled with the liquid crystal via a very small aperture in the plate 1 or the plate 2, which aperture is not shown. Said aperture is sealed after filling. If the device is filled at atmospheric pressure, a second hole is necessary for allowing the air to escape from the space 10. If the described thin layer of aluminum on the plate 1 is replaced by a transparent electrode of tin oxide, the digits can be observed in translucence (modulation of the transmitted light) which may be necessary for certain applications.

What is claimed is:

1. A device comprising two flat parallel supporting plates having smooth opposed surfaces, a layer of liquid crystal between the supporting plates, and means for spacing the supporting plates comprising a plurality of intersecting elongated elements each having a circular cross-section disposed between the smooth opposed surfaces of the supporting plates to separate the plates, said elongated elements being crushed at the points of intersection forming intersections of equal thickness with that of said elongated elements and forming a closed loop around said liquid crystal material.

* * * * *